(12) United States Patent
Song et al.

(10) Patent No.: US 8,508,953 B2
(45) Date of Patent: Aug. 13, 2013

(54) DRIVER DEVICE FOR COMPUTER MOTHERBOARD

(75) Inventors: Yong-Jun Song, Shenzhen (CN); Yong-Zhao Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 172 days.

(21) Appl. No.: 13/111,974

(22) Filed: May 20, 2011

(65) Prior Publication Data

US 2012/0268876 A1    Oct. 25, 2012

(30) Foreign Application Priority Data

Apr. 22, 2011   (CN) .......................... 2011 1 0101754

(51) Int. Cl.
*H05K 1/14*       (2006.01)
*H05K 1/11*       (2006.01)

(52) U.S. Cl.
USPC ......................................... 361/785; 361/784

(58) Field of Classification Search
USPC ................... 361/679.01, 784, 785, 788, 789; 439/65, 67, 70, 71, 77; 710/300, 301, 302
See application file for complete search history.

(56) References Cited

U.S. PATENT DOCUMENTS

| 5,073,116 A * | 12/1991 | Beck, Jr. ......................... 439/71 |
| 5,764,924 A * | 6/1998 | Hong ............................. 710/300 |
| 6,735,085 B2 * | 5/2004 | McHugh et al. ............... 361/719 |
| 2010/0199011 A1 * | 8/2010 | Chen et al. ..................... 710/301 |

FOREIGN PATENT DOCUMENTS

TW            378343 A  *  1/2000

* cited by examiner

*Primary Examiner* — Hoa C Nguyen
*Assistant Examiner* — Binh Tran
(74) *Attorney, Agent, or Firm* — Altis Law Group, Inc.

(57) ABSTRACT

A driver device includes a circuit board, a number of sockets, a number of driver chips, a control switch, and a signal output element. The sockets are positioned on the circuit board. Each driver chip is received in and electrically connected to a corresponding socket. The control switch includes a number of switches. An input of each switch is electrically connected to a corresponding socket. An output of each switch is electrically connected to the computer motherboard through the signal output element.

7 Claims, 3 Drawing Sheets

DRIVER DEVICE FOR COMPUTER MOTHERBOARD

BACKGROUND

1. Technical Field

The disclosure relates to a computer driver device for computer motherboard.

2. Description of Related Art

Generally, before shipment, many computer hosts must undergo test to ensure standards of quality. A Power On Self Test POST (POST) is an important part during testing the computer, such as, whether the memory is intact, the keyboard functions, and so on. Before the POST, a computer motherboard must be driven by a driver chip. Different types of computer motherboards use different types of driver chips to drive them. However, a typical driver chip is directly mounted on the computer motherboard. If the computer motherboard can be driven by that driver chip, it indicates that the driver chip is matched with the computer motherboard. Otherwise, that particular driver chip must be removed and a different driver chip must be mounted to drive the motherboard. This is very inconvenient, and the constant mounting, removal, and remounting of driver chips may cause damage the computer motherboard.

Therefore, it is desired to provide a driver device to overcome the above-described problem.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the disclosure will now be described in detail below, with reference to the drawings.

Figure 1:
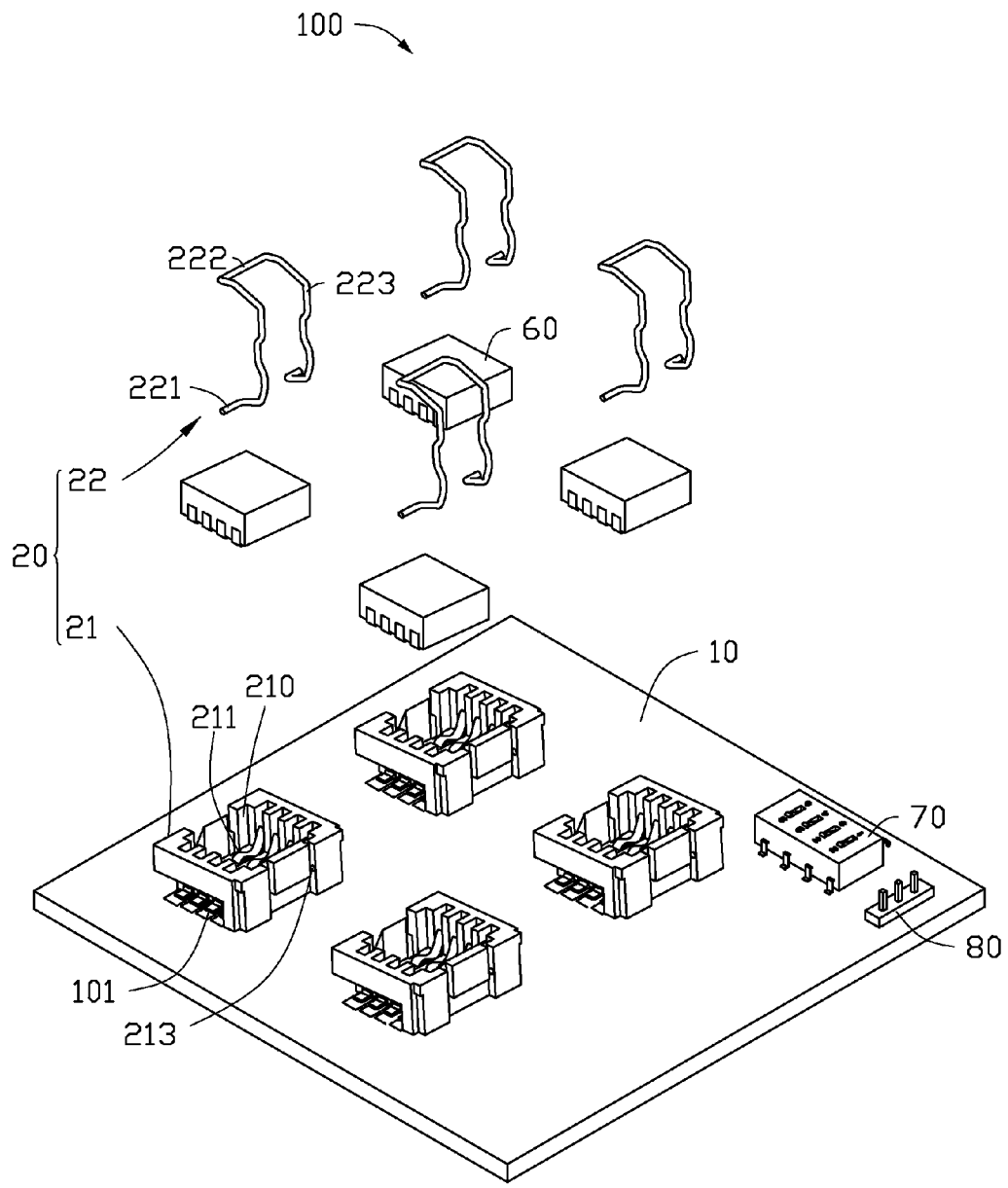
FIG. 1 is an exploded, schematic view of a driver device, according to an exemplary embodiment.
Figure 2:
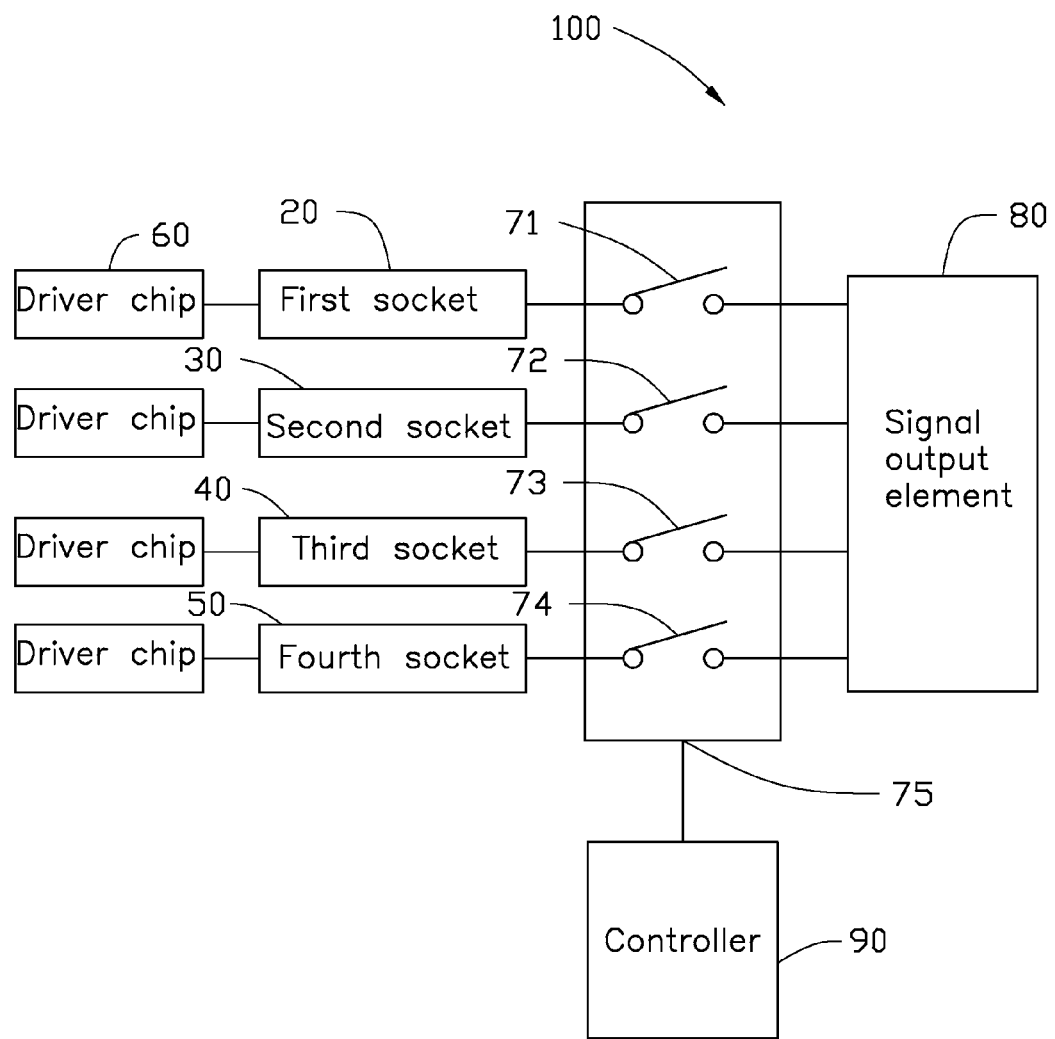
FIG. 2 is a functional block diagram of the driver device of FIG. 1.
Figure 3:
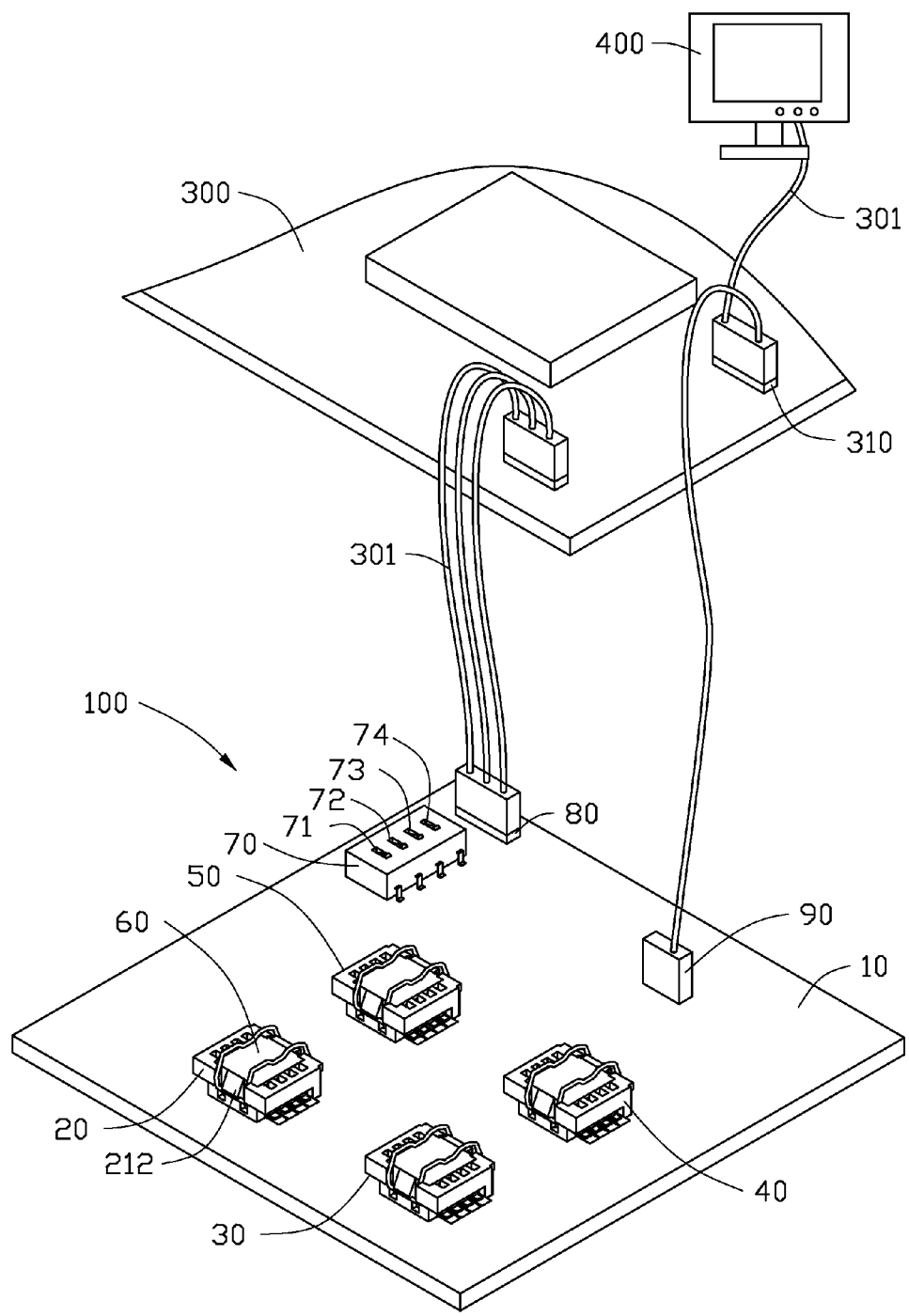
FIG. 3 is a schematic view of the driver device of FIG. 1, in use.

Referring to FIGS. 1-3, a driver device 100, according to an exemplary embodiment, is configured for driving a computer motherboard 300, when testing the computer motherboard 300. The driver device 100 includes a circuit board 10, a first socket 20, a second socket 30, a third socket 40, a fourth socket 50, four different types of driver chips 60, a control switch 70, and a signal output element 80.

The circuit board 10 is a printed circuit board (PCB), on which a number of electronic connections 101 are formed. The first socket 20, the second socket 30, the third socket 40, the fourth socket 50, the four different types of driver chips 60, the control switch 70, and the signal output element 80 are all mounted on the circuit board 10 and electrically connected to the corresponding electronic connections 101.

In this embodiment, the structures of the first socket 20, the second socket 30, the third socket 40, and the fourth socket 50 are the same. The structure of the first socket 20 only is described as an example. The first socket 20 includes a base 21 and an elastic member 22. The first socket 20 defines a groove 210 for receiving a corresponding driver chip 60. A number of electronic plates 211 are positioned in the groove 210 with one end of each electronic plate 211 being received in the groove 210 and the other end protruding from the base 21 and being electrically connected to the electronic connections 101. A hook-holding portion 212 extends perpendicularly upward from one outer sidewall of the base 21, a pair of pivot holes 213 are defined in another outer sidewall of the base 21 away from the hook-holding portion 212. In the embodiment, the pivot holes 213 and the hook-holding portion 212 are positioned at two opposite outer sidewalls of the base 21. The elastic member 22 is substantially "M" shaped and includes two pivots 221, a hook portion 222 away from the pivots 221, and two resisting portions 223. Each resisting portion 223 is positioned between one of the pivots 221 and the hook portion 222.

The control switch 70 includes a first switch 71, a second switch 72, a third switch 73, a fourth switch 74, and a control signal input 75. An input of the first switch 71 is electrically connected to the first socket 20, an output of the first switch 71 is electrically connected to the signal output element 80. An input of the second switch 72 is electrically connected to the second socket 30, an output of the second switch 72 is electrically connected to the signal output element 80. An input of the third switch 73 is electrically connected to the third socket 40, an output of the third switch 73 is electrically connected to the signal output element 80. An input of the fourth switch 74 is electrically connected to the fourth socket 50, an output of the fourth switch 74 is electrically connected to the signal output element 80. In the embodiment, when any one of the switches 71, 72, 73 or 74 is on, the remaining switches are off.

An output of the signal output element 80 is electrically connected to the computer motherboard 300 through a data line 301.

In assembly, each of the pivots 221 is rotatably received in a corresponding pivot hole 213, as such, the elastic member 22 is capable of being rotated about the pivot hole 213. The four different type driver chips 60 are respectively received in the grooves 210 of the first socket 20, the second socket 30, the third socket 40, and the fourth socket 50, with the electronic pins 61 of the driver chip 60 being in contact with the electronic plates 211. Then, the electric member 22 is rotated until the hook portion 222 is fastened on the hook-holding portion 212, at the same time, the corresponding driver chip 60 is elastically pressed backward by the resisting portions 223.

In the embodiment, the computer motherboard 300 further includes a first signal output 310 electrically connected to a display screen 400 through the data line 301. The driver device 100 further includes a controller 90 mounted on the circuit board 10. An input of the controller 90 is electrically connected to the first signal output 310, and an output of the controller 90 is electrically connected to the control signal input 75 of the control switch 70. When one of the switches, such as the first switch 71, is turned on and the other three switches 72, 73, 74 being shut off, and if the controller 90 detects that the first signal output 310 does not output a signal to the display screen 400 (in which situation the computer motherboard 300 does not work, and the display screen 400 remains blank), the controller 90 causes the first switch 71 to shut off and causes the other switches 72, 73, and 74 to turn on in order via the control signal input 75 of the control switch 70. For example, if the first switch 71 does not output drive signals to drive the computer motherboard 300, the controller 90 causes the first switch 71, the third switch 73, and the fourth switch 74 to switch off and turns on the second switch 72 to drive the computer motherboard 300. If the second switch 72 does not output the correct drive signal to drive the computer motherboard 300, the controller 90 turns off the second switch 72, the first switch 71, and the fourth switch 74, and turns on the third switch 73 to drive the computer motherboard 300, and so on, until a one of the driver chips 60 is able to drive the computer motherboard 300.

The numbers and the arrangements of the sockets and switches can be changed as the situation requires. For example, in other embodiments, the driver device 100 includes five sockets and five switches.

Unlike a conventional driver device, the driver device 100 of the present embodiment includes a number of sockets mounted on the circuit board 10 for electrically connecting different types of driver chips 60, as such, the driver device 100 is capable of driving different types of computer motherboards 300. Furthermore, in the POST, drive signals transmitted from different types of driver chips 60 are transmitted to the computer motherboard 300 through the sockets and the control switch 70, this will avoid damage to the computer motherboard 300 caused by changing out the driver chips 60 on the circuit board 10.

While certain embodiments have been described and exemplified above, various other embodiments will be apparent from the foregoing disclosure to those skilled in the art. The disclosure is not limited to the particular embodiments described and exemplified, and the embodiments are capable of considerable variation and modification without departure from the scope of the appended claims.

What is claimed is:

1. A driver device for driving a computer motherboard, comprising:
   a circuit board;
   a plurality of sockets mounted on the circuit board;
   a plurality of different types of driver chips, each driver chip being received in and electrically connected to a corresponding socket;
   a signal output element mounted on the circuit board, an output of the signal output elemental being configured for electrically connecting to the computer motherboard;
   a control switch comprising a plurality of switches, an input of each switch electrically connected to a corresponding socket, an output of each switch electrically connected to an input of the signal output element; and
   a controller, wherein the controller is mounted on the circuit board and electrically connected to the plurality of sockets, the controller is configured for selectively controlling one of the plurality of sockets to turn on and causing the other switches to switch off, unit one of the driver chips is able to drive the computer motherboard.

2. The driver device of claim 1, wherein the plurality of sockets comprises a first socket, a second socket, a third socket, and a fourth socket, the control switch comprises a first switch, a second switch, a third switch, and a fourth switch, an input of the first switch is electrically connected to the first socket, an output of the first switch is electrically connected to the signal output element, an input of the second switch is electrically connected to the second socket, an output of the second switch is electrically connected to the signal output element, an input of the third switch is electrically connected to the third socket, an output of the third switch is electrically connected to the signal output element, an input of the fourth switch is electrically connected to the fourth socket, an output of the fourth switch is electrically connected to the signal output element.

3. The driver device of claim 2, wherein the controller is electrically connected to the first, second, third and fourth switches, the controller is configured for selectively controlling one of the first switch, the second switch, the third switch and the fourth switch to turn on.

4. The driver device of claim 3, wherein the control switch further comprises a control signal input, an input of the controller is configured for electrically connecting to the computer motherboard, and an output of the controller is electrically connected to the control signal input of the control switch.

5. The driver device of claim 1, wherein each socket comprises a base and an elastic member, the base comprises a plurality of electronic plates and defines a groove, the electronic plates are positioned in the groove with one end of each electronic plate being received in the groove and the other end protruding out of the base and being electrically connected to the circuit board, the groove receives a corresponding driver chip, the base further comprises a hook-holding portion extending perpendicularly upward from an outer sidewall thereof, and defines a pair of pivot holes in another outer sidewall thereof, the pivot holes and the hook-holding portion are positioned opposite to each other, the elastic member comprises two pivots and a hook portion, each pivot is received in a corresponding pivot hole, the hook portion hooks the hook-holding portion.

6. The driver device of claim 5, wherein the elastic member is substantially "M" shaped and further comprises two resisting portions, each resisting portion is positioned between a corresponding pivot and the hook portion and resists against the corresponding driver chip.

7. The driver device of claim 1, wherein the circuit board is a printed circuit board.

* * * * *